Figure 1:
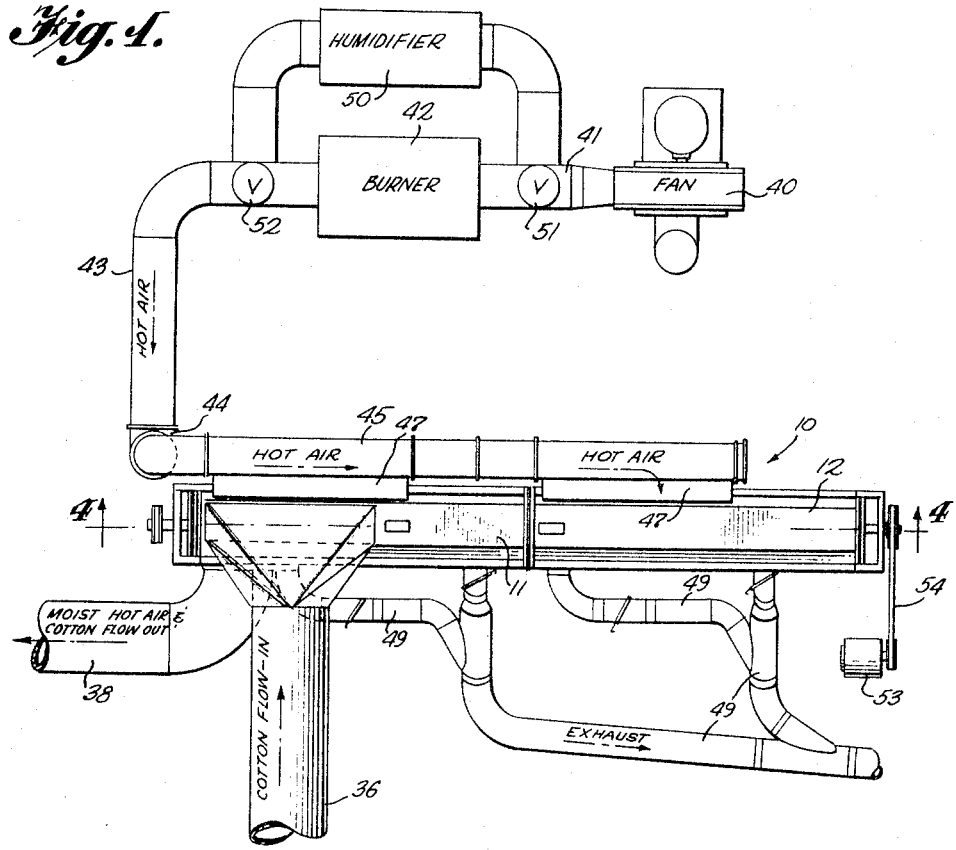

Aug. 30, 1966  H. G. MOSS ETAL  3,269,029
JET SPIRAL DRIER
Filed Jan. 11, 1963  3 Sheets-Sheet 1

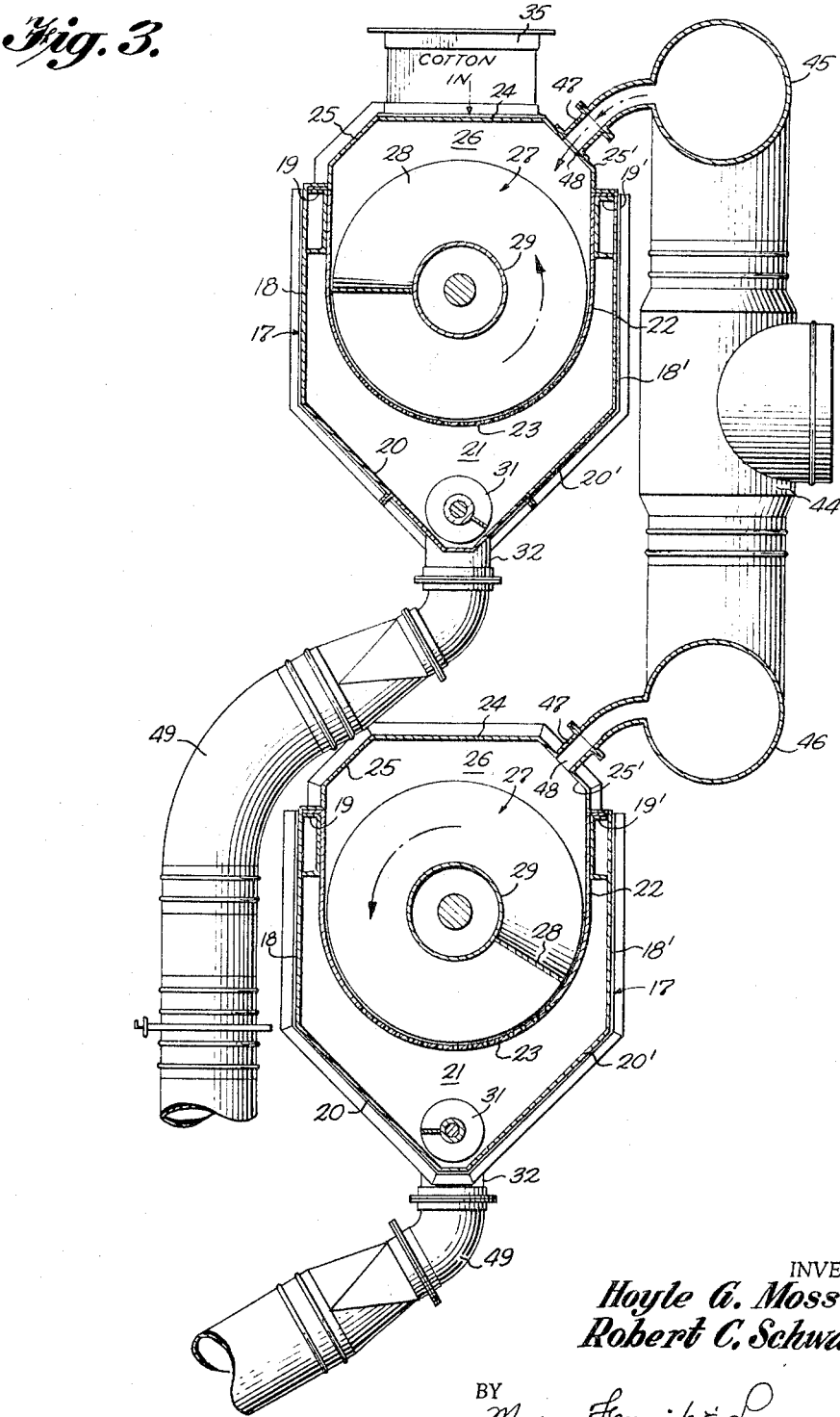

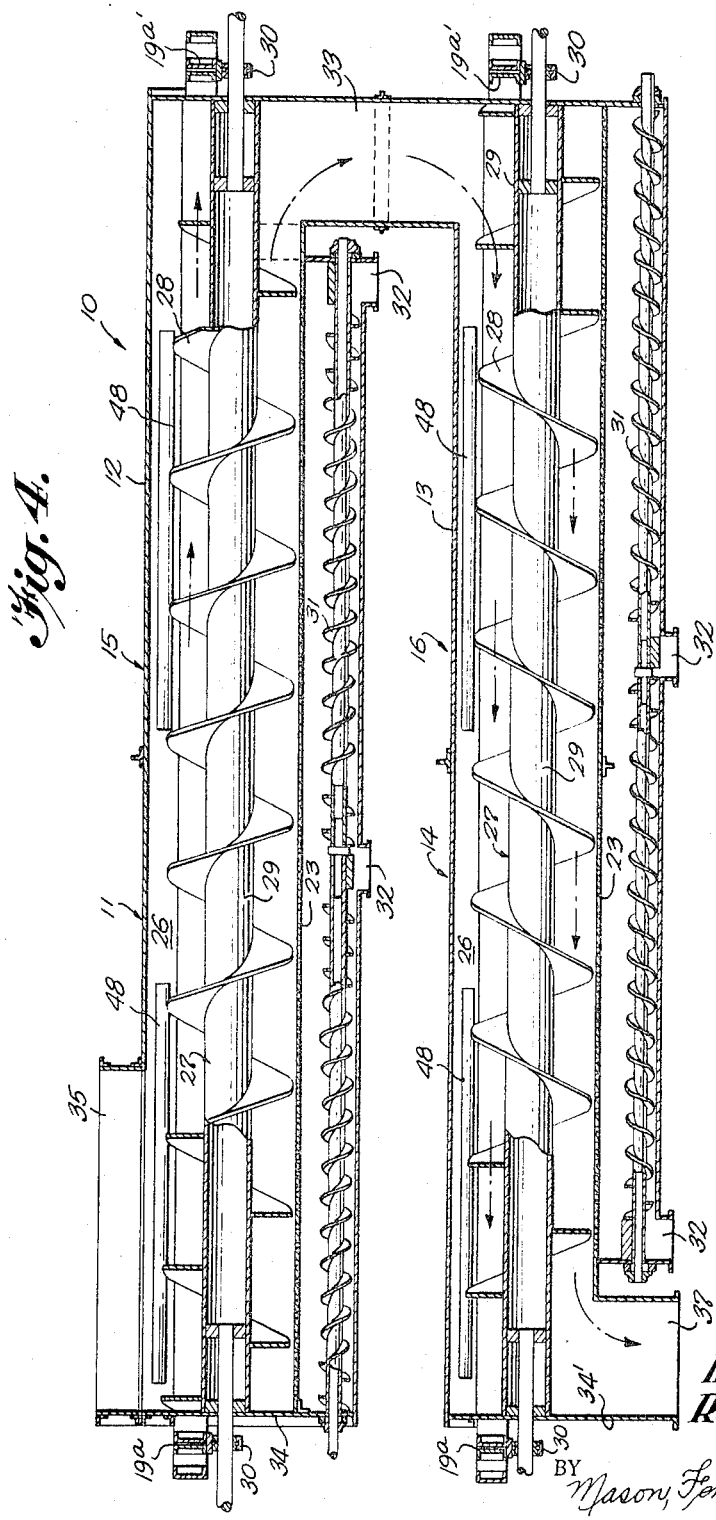

United States Patent Office 3,269,029
Patented August 30, 1966

3,269,029
JET SPIRAL DRIER
Hoyle G. Moss and Robert C. Schwartz, Lubbock, Tex., assignors, by mesne assignments, to Continental/Moss-Gordin, Inc., Prattville, Ala., a corporation of Delaware
Filed Jan. 11, 1963, Ser. No. 250,834
7 Claims. (Cl. 34—182)

The present invention relates in general to material treating apparatus, and more particularly to apparatus for conditioning seed cotton and the like, as by drying or humidifying the cotton preparatory to ginning.

While the apparatus of the present invention is applicable to treating a wide variety of materials, it is particularly suited to drying or humidifying of seed cotton to selected moisture conditions before introduction of the cotton into cleaning machinery of a gin installation, and the ensuing description will be directed to this particular application.

The extensive seed cotton cleaning equipment that has been devised in recent years to preserve the quality of ginned lint derived from rough-harvested or machine harvested cotton has increased the need for effective and efficient conditioning of the seed cotton as it is introduced into the cleaning machinery. It was found that much of the cleaning machinery could not be practicably used on damp cotton, that dry cotton can be cleaned much more readily than damp cotton, and that cotton dried to certain moisture conditions with a drier may be subjected, without adverse effect on fiber quality, to a greater amount of seed cotton cleaning by machinery than undried cottons.

Initially, tower driers or shelf-type driers came into common use to dry the cotton prior to its introduction into the cleaning equipment. These driers were designed to provide a certain amount of drying of the seed cotton depending upon the moisture conditions normally encountered in the harvested seed cotton obtained from the particular geographical area served by the gin. Thus, the flow of cotton in such driers was dependent upon the velocity of the air, or the length of pipe, or other fixed flow paths, which could not easily be changed once the drier was installed.

Another type of drier equipment which has more recently come into use is the so-called "Big Reel" drier, wherein cotton is fed into the drier, a charge of high-temperature air is introduced into the drier at the beginning of the drying cycle at a selected air inlet zone, and the cotton and heated air are carried all the way through the system without extracting any moisture-laden air from communication with the cotton. Such a drier construction results in surges of cotton into the cleaning machinery following it, instead of supplying the cotton to the cleaning machinery in a continuous steady flow of cotton in quantities it can effectively handle, and provides intermittent discharges during which the cotton and heated air are maintained in close thermal exchange relation with one another for a sufficient period to produce the desired evaporation of moisture from the cotton.

An object of the present invention is the provision of a novel conditioner for materials such as seed cotton and the like for treating the materials to attain a desired moisture condition thereof.

Another object of the present invention is the provision of a novel conditioner apparatus for treating seed cotton and the like to attain a desired state of dryness of the seed cotton prior to introduction into cleaning machinery, wherein means are provided for conveying the cotton in exchange relation to heated or humidified air for selected variable periods of time.

Another object of the present invention is the prevision of a novel conditioner apparatus for seed cotton and the like of the type described in the preceding paragraph wherein cotton is discharged from the conditioner in a substantially steady flow.

Another object of the present invention is the provision of novel apparatus for drying or humidifying seed cotton and the like, of the type described in the preceding paragraphs, wherein conditioning air is introduced into exchange relation with the cotton at a plurality of spaced points along a conditioning path and portions of saturated air and foreign matter are separated from the cotton and bled off from the apparatus at plural points along the conditioning path.

Other objects, advantages and capabilities of the present invention will become apparent from the following detail description, taken in conjunction with the accompanying drawings illustrating a preferred embodiment of the invention.

Figure 2:
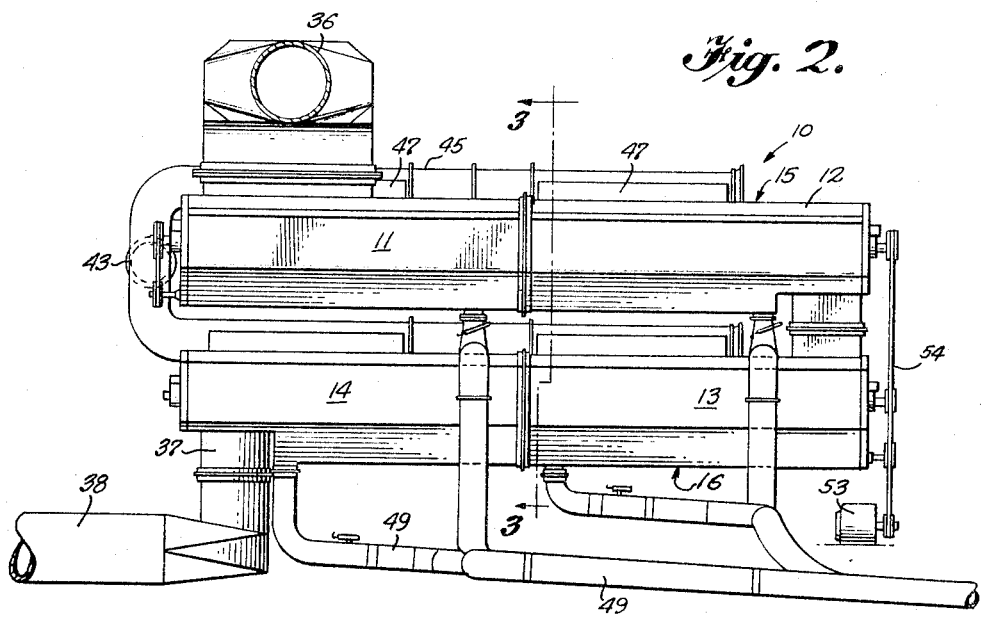

In the drawing:
FIGURE 1 is a top plan view of a seed cotton drier embodying the present invention;
FIGURE 2 is a side elevation view of the seed cotton drier;
FIGURE 3 is a vertical transverse view taken along the line 3—3 of FIGURE 2; and
FIGURE 4 is a vertical longitudinal section view taken along the line 4—4 of FIGURE 1.

Referring to the drawings, wherein like reference characters designate corresponding parts throughout the several figures, the cotton conditioner of the present invention, indicated generally by the reference character 10, comprises a group of elongated casing sections 11, 12, 13, 14 connected in pairs to form upper and lower tiers 15, 16. The casing sections of the upper and lower tiers are similarly constructed and include an outer casing 17 having side walls 18, 18' supported from channel beams 19, 19' at the upper ends thereof and having inwardly converging lower wall portions 20, 20' defining a trough-shaped collecting chamber 21 at the bottom of the outer casing 17. Disposed within and projecting above the outer casing is an inner casing 22 likewise supported on the channel beams 19, 19' having an arcuately curved perforated metal or screen portion 23 along the bottom part thereof and a top wall portion 24 and upwardly converging inclined wall portions 25, 25' spaced above the channel beams. The inner casing 22 defines an elongated cotton conditioning chamber 26 and houses a screw conveyor 27 having a helical vane 28 supported on a shaft or tubular core 29 journaled at opposite ends in bearings 30 supported on transverse beam members 19a, 19a' connected to the channel beams 19, 19'. A spiral conveyor 31 is also provided in the apex defined at the bottom of the outer casing 17 by the downwardly converging side wall portions 20, 20' and is journaled in bearing blocks and suitably driven to convey material deposited in the trough-shaped collecting chamber 21 to one of the discharge openings 32 at or near an end of the casing sections.

A vertical connecting duct 33 extends from one end (the discharge end) of the casing section 12 of the upper tier 15 to the correspondingly located end of the casing section 13 of the lower tier 16 to deliver cotton discharged from the former to the latter. The opposite ends of the upper and lower tiers 15, 16 are closed by end walls 34, 34' at the left hand ends of casing sections 11 and 14, as viewed in FIGURE 4.

Adjacent the end wall 34 of casing section 11 is an axially elongated upwardly opening cotton inlet 35, designed to receive cotton from a suitable cotton supply duct 36 through a conventional rotary air seal (not shown). The cotton, after it passes through the successive casing sections 11, 12, 13 and 14, is discharged through a depending discharge outlet 37 into ducting 38, along which such moist hot air as remains entrained with the cotton at the outlet 37 for delivery to the cotton cleaning machinery.

A ducting system is provided for injecting heated air or otherwise conditioned air into both the upper and lower tiers of the elongated conditioning chamber 26 at a plurality of axially elongated zones so as to effect introduction of new heated or conditioned air at a number of different points through the conditioning chamber system. The arrangement by which heated air is injected in one preferred embodiment includes a fan 40 for directing air via duct 41 through a burner 42 or other suitable air heating facility, the heated air then being conducted through a common outlet duct 43 to a branched fitting 44 and divided into two parallel hot air manifold ducts 45, 46 extending alongside the upper and lower conditioner tiers 15, 16. Axially elongated air inlet conduits 47 extend laterally from the manifold ducts 45, 46 to long air inlet slots 48 in one of the inclined wall portions, for example the wall portion 25', of the inner casing 22 of each casing section to inject the hot air into the conditioning chamber 26 of each casing section over a major portion of the axial length of the associated casing section, preferably starting adjacent the feed end of the casing section. In one practical example the inlet slots 48 may have a length of about six feet for casing sections of about ten feet axial length and a screw conveyor of twenty-four inches diameter.

Suitable ducting is also connected to the discharge openings 32 to provide moist hot air and trash outlet lines 49 for withdrawing air which passes through the screen 23 and trash, dirt and dust which pass into the collecting chamber 21 to an external collecting facility.

A humidifier indicated at 50, of known construction, may be provided in parallel relation to the burner 42 relative to the conditioning air supply system, communicating with the ducts 41 and 43 for example by conventional valves 51, 52 to supply conditioned air of a desired moisture content to the conditioning chamber 26 to treat the cotton so as to secure a selected moisture condition.

The shafts 29 of the screw conveyors 27 are driven from a conventional type of variable speed drive 53 through a suitable coupling 54 to permit regulation of the speed at which cotton is advanced through the conditioning chamber 26 in accordance with the initial condition of the cotton.

In the operation of the cotton conditioner, seed cotton is dropped through a rotary air seal and the cotton inlet 35 into the feed end portion of the cotton conditioning chamber 26 formed by the first casing section 11 and is advanced axially of the upper tier of chamber 26 in a gently rolling and tumbling fashion along a generally spiral path by a screw conveyor 27. As the cotton is advanced over the perforated screen portion 23 of the inner casing, trash entrained with the cotton is carried through the screen openings by some of the hot air blown into the conditioning chamber along the air inlet slot 48 of the first casing section 11. The screw rotation carries the cotton up toward the air inlet slot 48 where the air is blown in and mixed with the cotton. If the cotton needs to be dried to a lower moisture content, the air injected through the inlet slot 48 is heated air obtained through the burner 42, and passes into thermal exchange relation with the cotton to evaporate moisture from the cotton. As the heated air absorbs moisture from the cotton and becomes saturated or more nearly saturated and therefore more dense it falls through the screen portion 23 into the collecting chamber 21 and is bled off with the trash through the discharge lines 49. The long air inlet slots 48 of the casing sections 11 and 12 allow the entrance of fresh hot air insuring progressive introduction of dry hot air into the conditioning chamber along the length of travel of the cotton during the whole period of cotton treatment, rather than relying on a single initial injection of hot air to accomplish the required drying effect. At the opposite or discharge end of the upper tier conditioning chamber 26, the cotton and some air flows through the transfer duct 33 into the lower tier conditioning chamber, which feeds the cotton to the discharge outlet 37, mixing more heated air with the cotton and bleeding off more saturated air with trash. Finally, the cotton drops out through discharge outlet 37 and is carried through ducting 38 by a portion of the air to the subsequent processing machinery. Thus, some cleaning of the cotton is effected while the cotton is being dried or conditioned during passage through the apparatus, and quantities of fresh heated air are introduced into exchange relation with the cotton as it progresses through the apparatus while saturated or denser air is progressively bled off. It will be apparent that moisture conditions of the cotton can be altered in other ways to suit the selected requirements, as for example by humidifying the cotton with humid air obtained through the humidifier 50 and injected through the inlet slots 48.

The extent of drying or other conditioning of the cotton can be readily adjusted to suit the initial condition of the cotton by merely altering the speed of operation of the screw conveyor 27 by means of the variable speed drive 53. This, of course, varies the time of cotton exposure to the conditioning air, and thus the total effective treatment of the cotton. Variation of the speed of drive of the screw conveyor 27 may be effected by manual control means of known construction in a control console or by automatic means responsive to automatic sensors detecting the moisture content of the cotton at a selected point or points in the system.

For example, automatic control means for regulating the speed of drive of the screw conveyor 27 may include temperature sensors positioned to sense the temperature of the air going into the dryer and of the air from the discharge after it has separated from the cotton, the change or differential temperature between the air at these locations being used as a basis for controlling the conveyor speed. This provides an indirect measurement of moisture content, since a given amount of moisture present in the cotton produces a given temperature change with a given inlet air temperature.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for treating seed cotton and the like to alter the moisture content thereof by exposure to treating air having a preselected temperature and humidity to effect moisture exchange therebetween comprising horizontally elongated casing means having a feed end and a discharge end, said casing means including exterior wall means and a stationary interior partition having an upwardly concave semi-cylindrical perforate curved wall portion concentric with a substantially horizontal longitudinal axis of the casing means dividing the space bounded by said exterior wall means into an upper conveyor chamber and a lower trash collecting chamber of substantially co-extensive extent longitudinally of the casing means, a rotatable conveyor screw in said upper conveyor chamber extending the length thereof having its periphery disposed in a cylindrical path concentric with said axis and immediately adjacent said curved wall portion for advancing cotton therealong from the feed end to the discharge end of said casing means, said curved wall portion having openings distributed along the axial length thereof below the horizontal plane through said axis sized to retain cotton fed into said casing means at the feed end thereof in the path of said conveyor screw to be advanced along a flow path toward said discharge end and permitting passage of trash and moisture laden air therethrough into said collecting chamber, said collecting chamber extending in radially outwardly surrounding relation to said curved wall portion and having communication with said conveying chamber only through said openings in said curved wall portion, treating air supply means including air inlet opening means opening directly into said conveying chamber above said horizontal plane and spaced out of direct communication with said collecting chamber to discharge treating air downwardly into moisture exchange relation with the cotton in said conveying chamber, and exhaust duct means coupled directly to said collecting chamber for continuously withdrawing trash and moisture laden air therefrom.

2. Apparatus for treating seed cotton and the like as defined in claim 1, wherein said casing means includes side wall means extending upwardly from said curved wall portion adjacent said plane and top wall means joining said side wall means collectively forming upper conveyor chamber walls and co-acting with said curved wall portion to define said conveyor chamber, said side and top wall means being spaced from said cylindrical path to provide an uninterrupted air space above the conveyor screw, said exterior wall means including top wall portions upwardly bounding said collecting chamber joining said side wall means between said top wall means and said plane, and said air inlet opening means being located in said upper conveyor chamber walls above the cylindrical path of the conveyor screw periphery and above the juncture of said top wall portions of said collecting chamber.

3. Apparatus for treating seed cotton and the like as defined in claim 2, wherein said air inlet opening means have inlet openings which are elongated axially of said conveyor chamber and collectively span the major portion of the axial length of said conveyor chamber, said inlet openings being disposed at a plurality of locations spaced along said axis.

4. Apparatus for treating seed cotton and the like as defined in claim 1, wherein said air inlet opening means have inlet openings which are elongated axially of said conveyor chamber and collectively span the major portion of the axial length of said conveyor chamber, said inlet openings being disposed at a plurality of locations spaced along said axis.

5. Apparatus for treating seed cotton and the like as defined in claim 1, wherein said conveyor chamber and collecting chamber each span substantially the whole length of said casing means, and the sized openings in said curved wall portion being distributed over substantially the whole length of said conveyor chamber to effect withdrawal of moisture laden air passing from said conveyor chamber through said sized openings directly into said exhaust duct means from all points along the length of said conveyor chamber to progressively withdraw the moisture laden air from exchange relation with the cotton as the latter advances along the conveyor chamber.

6. Apparatus for treating seed cotton and the like as defined in claim 2, wherein said conveyor chamber and collecting chamber each span substantially the whole length of said casing means, and the sized openings in said curved wall portion being distributed over substantially the whole length of said conveyor chamber to effect withdrawal of moisture laden air passing from said conveyor chamber through said sized openings directly into said exhaust duct means from all points along the length of said conveyor chamber to progressively withdraw the moisture laden air from exchange relation with the cotton as the latter advances along the conveyor chamber.

7. Apparatus for treating seed cotton and the like as defined in claim 1, wherein said treating air supply means includes valved air duct means connected to said air inlet opening means, and air heating means and air humidifying means are coupled to said valved air duct means to selectively supply heated air and humidified air to said air inlet opening means.

References Cited by the Examiner

UNITED STATES PATENTS

| | | | |
|---|---|---|---|
| 1,489,702 | 4/1924 | Hare | 34—183 |
| 1,599,863 | 9/1926 | Baker | 209—247 |
| 1,781,343 | 11/1930 | Roan | 209—283 |
| 1,918,774 | 7/1933 | Murray | 209—247 |
| 1,930,952 | 10/1933 | Green | 34—85 |
| 1,989,751 | 2/1935 | Hagler et al. | 34—182 |
| 2,160,253 | 5/1939 | Rylander | 34—85 |
| 2,877,900 | 3/1959 | Kinderknecht | 209—283 |
| 3,043,430 | 7/1962 | Gish | 209—464 |

NORMAN YUDKOFF, WILLIAM F. O'DEA,
*Examiners.*

F. E. DRUMMOND, C. R. REMKE,
*Assistant Examiners.*

FREDERICK L. MATTESON, JR., *Primary Examiner.*